(12) United States Patent
Chen

(10) Patent No.: US 6,839,226 B2
(45) Date of Patent: Jan. 4, 2005

(54) KEYBOARD WITH ADJUSTABLE SUPPORT DEVICES

(75) Inventor: Jihuang Chen, Longtan Hsiang (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/638,701

(22) Filed: Aug. 11, 2003

(65) Prior Publication Data

US 2004/0037027 A1 Feb. 26, 2004

(30) Foreign Application Priority Data

Aug. 15, 2002 (TW) .................................... 091118394 A

(51) Int. Cl.[7] ................................................ G06F 1/16
(52) U.S. Cl. ...................... 361/680; 400/681; 248/688; 248/918
(58) Field of Search ................................ 361/680, 683; 341/22; 345/168; 235/145 R; 400/681; 248/688, 918

(56) References Cited

U.S. PATENT DOCUMENTS 5,735,618 A * 4/1998 Gluskoter et al. .......... 400/472
5,818,690 A * 10/1998 Spencer ...................... 361/680
6,485,209 B2 * 11/2002 Oura et al. .................. 400/681
6,654,230 B1 * 11/2003 Jones et al. ................. 361/680

* cited by examiner

Primary Examiner—Lynn Feild
Assistant Examiner—Anthony Q. Edwards
(74) Attorney, Agent, or Firm—Snell & Wilmer L.L.P.

(57) ABSTRACT

A keyboard with adjustable support devices for supporting the keyboard at several levels is provided. Each support device includes a leg able to rotate along the bottom of the keyboard. The angle between the axis of rotation and the bottom plane of the keyboard has a value other than 90 degrees. The leg is selectively posed at the first or second state. When the leg is at the first state, the tilt angle between the keyboard and a desk is smaller. When the leg is at a second state, the tilt angle between the keyboard and a desk is larger. There are multiple support devices provided on the bottom plane of the keyboard. Therefore, the keyboard provides multiple variations in angle and height by adjusting the positions of the legs.

17 Claims, 14 Drawing Sheets

KEYBOARD WITH ADJUSTABLE SUPPORT DEVICES

This Application claims priority to Taiwan Patent Application No. 091118394 filed on Aug. 15, 2002.

FIELD OF INVENTION

The present invention generally relates to an adjustable keyboard and, more particularly, a keyboard with adjustable support devices for supporting various portions of a keyboard at several levels. By using such device, users can adjust the angles or heights of the keyboard to meet ergonomics demand or personal needs.

BACKGROUND OF THE INVENTION

Keyboards are the most common tools for inputting data or commands into computers. Therefore, it has long been an issue to provide users with comfortable keyboards. As far as the conventional techniques are concerned, present keyboard supporting devices only allow slight degrees of inclination towards users. Such a monotonous method for adjusting keyboards is not sufficient for meeting all users' needs. In particular, with varying shapes and styles of keyboards available on the market, keyboards that can be adjusted in only one direction surely cannot meet each user's needs; sometimes, they may even make users feel uncomfortable. Accordingly, there is a great need for a new design of keyboards that allow users to make adjustments for personal needs.

The conventional technique of adjusting the angle between a user and a keyboard is to install a pair of supporting legs at a position close to the front edge of the keyboard's bottom surface; the legs can be stretched out or pulled back to adjust the angle. As shown in FIG. 1(a), when legs 22 are both received in the recesses at the bottom surface, the bottom surface of keyboard 2 is in complete contact with the desk surface 4, and no angle is formed between keyboard 2 and desk surface 4. When legs 22 are turned for a certain angle to extend out of the bottom surface, as shown in FIG. 1(b), an angle between desk surface 4 and keyboard 2 is then formed, and the top surface of the keyboard 2 is slightly inclined toward users.

Although the conventional technique did adjust the inclination angle of the keyboard, there still remains some inconvenience for users. Since legs 22 are installed only at the front part of keyboard 2, the keyboard can be adjusted for merely one angle; a user is not able to make variant adjustments according to the user's preference.

SUMMARY OF THE INVENTION

The present invention relates to a keyboard which has several supporting devices. Each device includes a leg and a first aperture. The leg has a supporter and a rod. The first aperture matches the rod in shape and size and engages with the rod, around which the leg rotates. The axis of the first aperture inclines at an angle which is larger than 0° and smaller than 90°, and penetrates the bottom surface rather than being perpendicular to it. The rod protrudes out of the supporter and its axis is also not perpendicular to the supporter. Such arrangement allows the legs to be completely received in the recesses (first state); also, it allows the supporter to rotate around the rod as axis so that part of the leg protrudes out of the bottom surface (second state).

By adjusting the legs to the positions of the first or second state, the keyboard may then have multiple patterns: the front surface may incline towards or outwards from users, the bottom surface may be in complete contact with a desk surface, or the whole keyboard may elevated to a certain height.

DETAILED DESCRIPTION

The present invention mainly provides a keyboard with a specially designed supporting device; the inclination angle and height of the keyboard can be adjusted according to each user's personal preference.

The bottom surface of the keyboard of the present invention includes at lease one supporting device. Each device includes a leg and a first aperture; both are installed into the bottom surface. The axis of the first aperture is not perpendicular to the bottom surface; rather, it inclines and forms an angle which is larger than 0° and smaller than 90° with the bottom surface. The leg has a supporter and a rod. The rod matches the first aperture in shape and size. The leg is rotatably connected to the first aperture. When the supporter axially rotates along the rod, moving from a first state to a second state, one end of the leg will protrude out of the bottom surface gradually. At the same time, the angle between the keyboard and the desk surface can be adjusted accordingly.

There is a recess, which is designed to receive the leg(s), at the bottom surface of the keyboard. The first aperture is located at the recess to completely receive the leg when it is in the first state.

To make it easier to use, a second aperture and a third aperture are installed into the bottom surface of the keyboard. A boss may be installed onto the leg and engages with the second or third aperture selectively to fix the position of the leg when it is in the first or second state respectively.

Figure 1A:
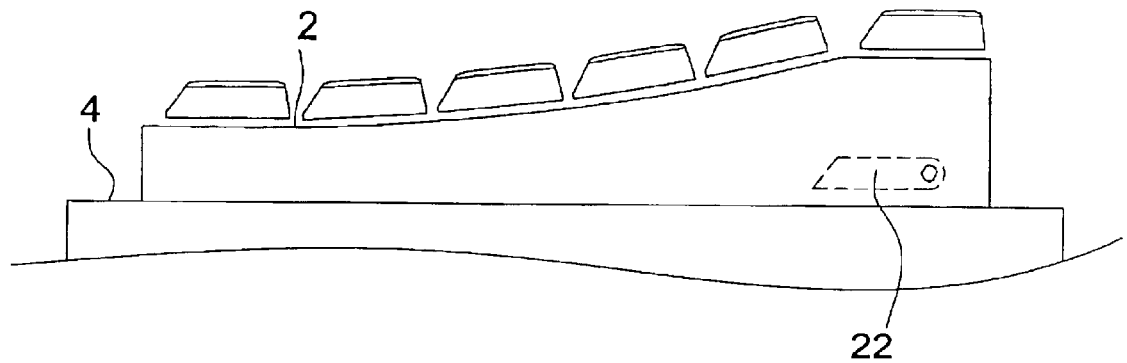
FIG. 1(a) is a side view of a conventional keyboard when its legs are received in the bottom surface.
Figure 1B:
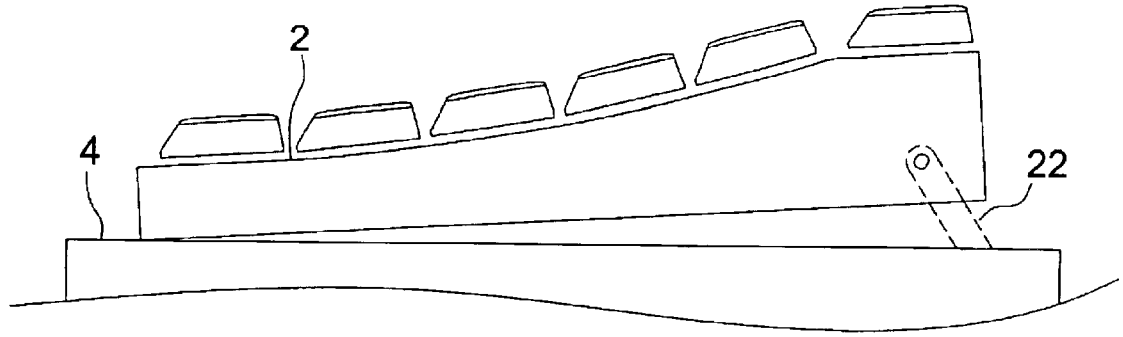
FIG. 1(b) is a side view of a conventional keyboard when its legs extend out of the bottom surface.
Figure 2:
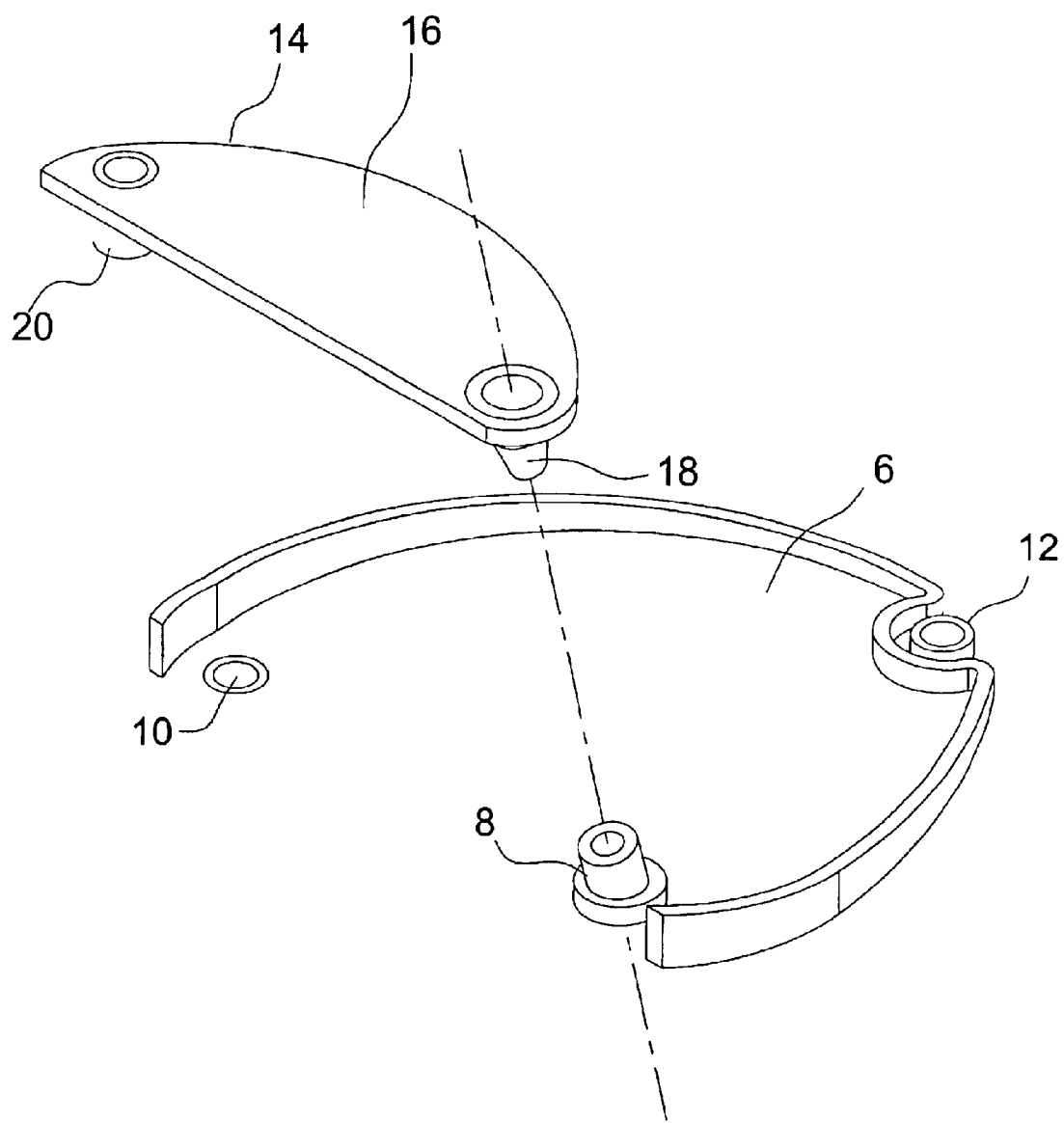
FIG. 2 is an explosive view of one embodiment of the supporting device of the present invention.

FIG. 2 shows a support device of one embodiment of the present invention. Leg 14 includes a supporter 16, a rod 18 and a boss 20. Supporter 16 has a shape approximately of a semi-circle. Rod 18 and boss 20 are located approximately at two ends, which are namely first end and second end respectively, of the diameter. On the bottom surface of the keyboard are a recess 6, a first aperture 8, a second aperture 10 and a third aperture 12. The main function of recess 6 is to receive leg 14. The distance between recess 6 and the bottom surface decreases as the keyboard changes its position from the first state to the second state. Rod 18 is bolted to first aperture 8.

Figure 3A:
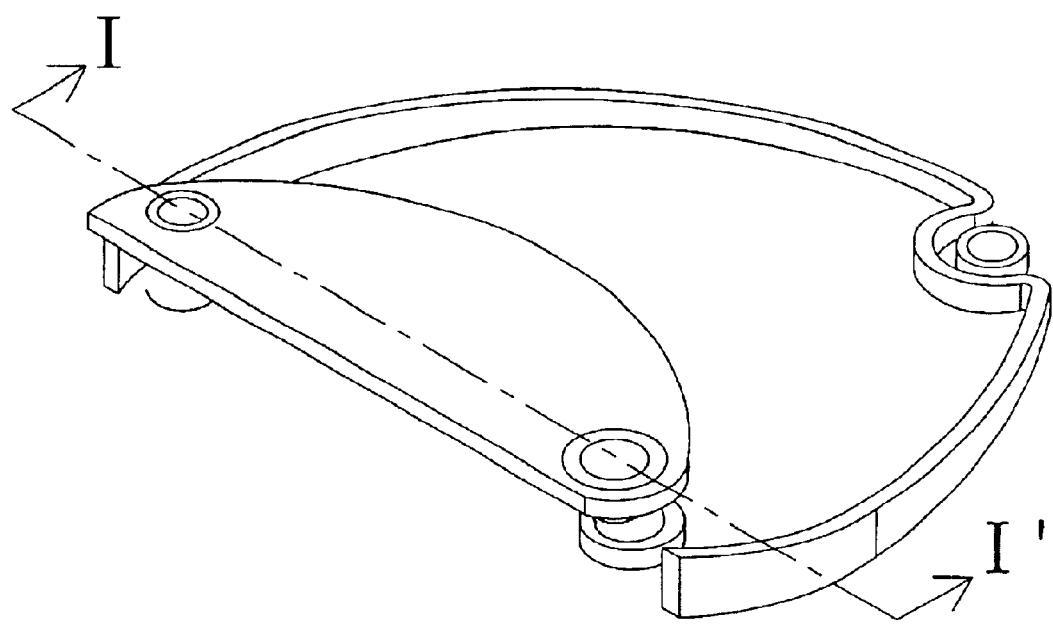
FIG. 3(a) is a perspective view of one embodiment of the present invention when one single leg is in the first state.
Figure 3B:
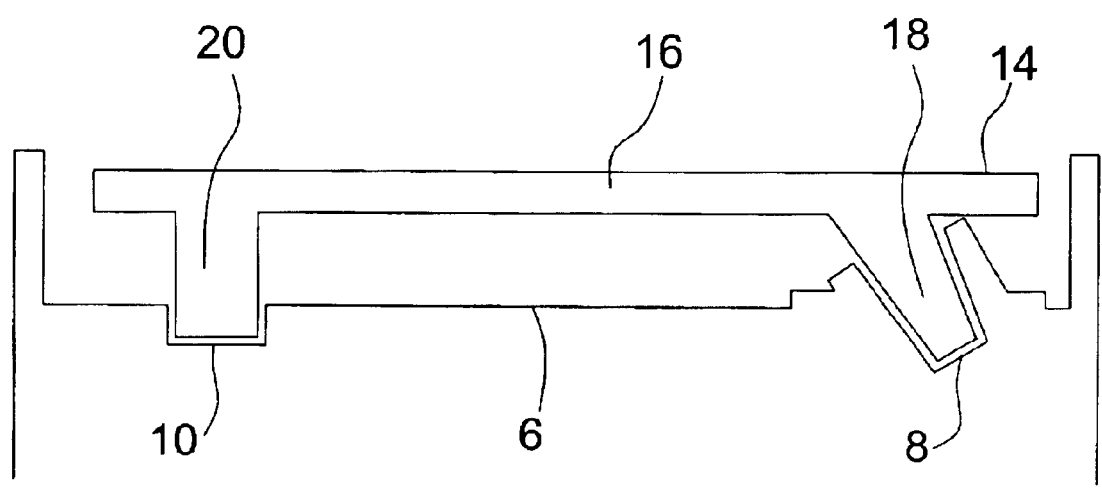
FIG. 3(b) is a cross-sectional view of one embodiment of the present invention when one single leg is in the first state.

FIG. 3(a) is a perspective view of the support device when the leg is in the first state. FIG. 3(b) is a cross-sectional view of the support device along tangent I–I' of FIG. 3(a). As shown in FIG. 3(b), leg 14 may axially rotate around rod 18. The axis of the first aperture 8 inclines at an angle which is larger than 0° and smaller than 90°, and penetrates the bottom surface 2 rather than being perpendicular to it. In order to coordinate with first aperture 8, rod 18 also connects to one side of supporter 16 at a certain angle. Due to the inclination angles of aperture 8 and rod 18, leg 14 can be completely received in recess 6. Boss 20 engages with second aperture 10 to keep its position fixed.

Figure 4A:
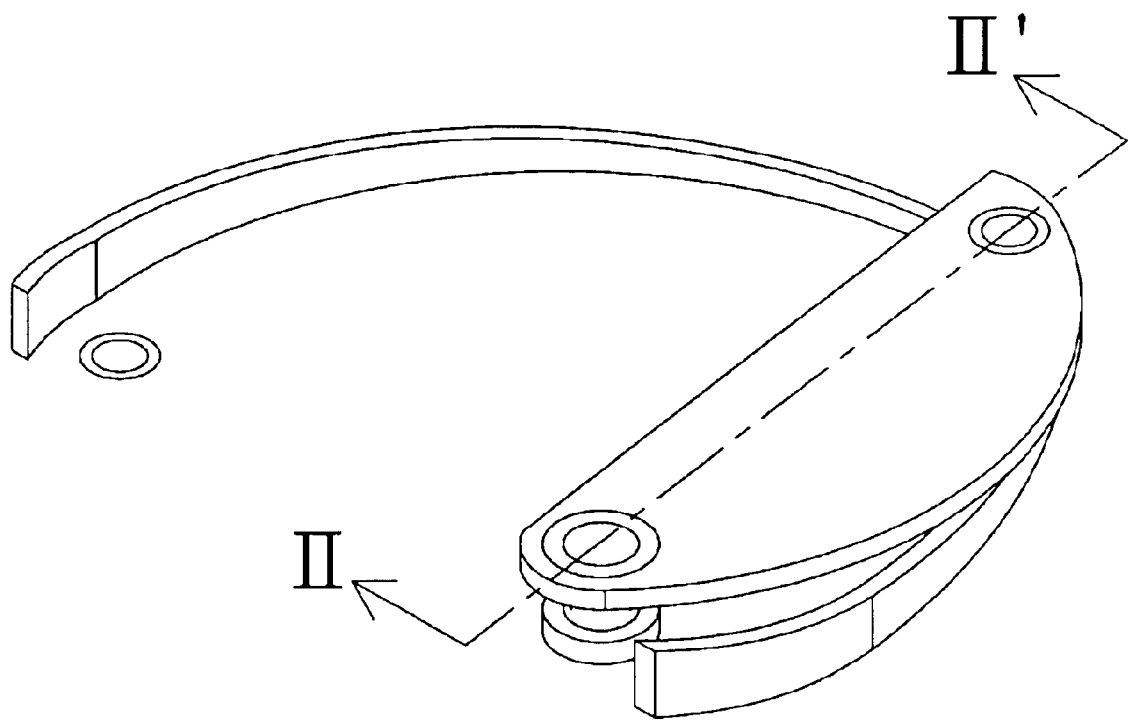
FIG. 4(a) is a perspective view of one embodiment of the present invention when one single leg is in the second state.
Figure 4B:
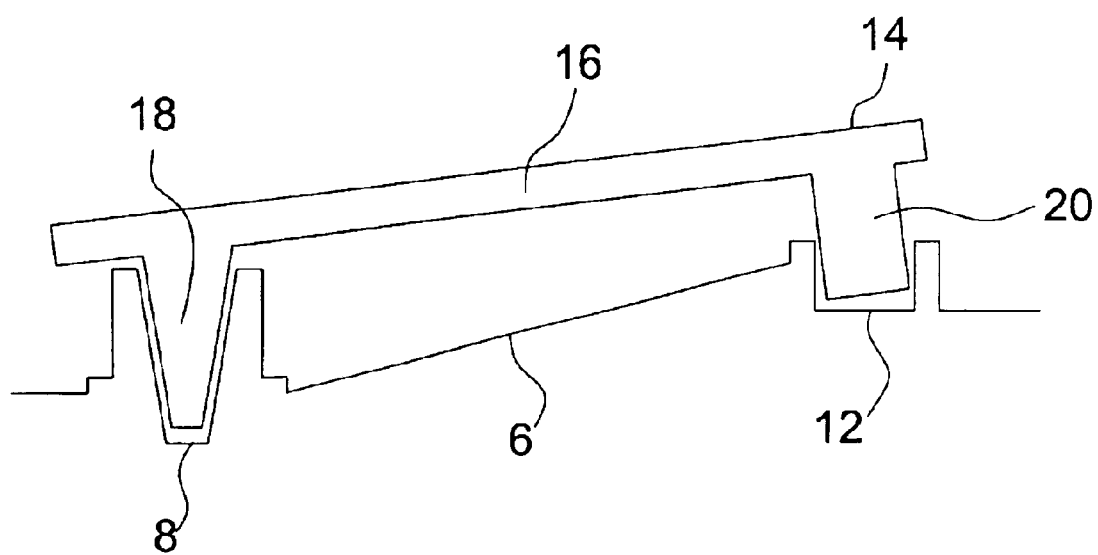
FIG. 4(b) is a cross-sectional view of one embodiment of the present invention when one single leg is in the second state.

By rotating leg 14 to make it gradually extend out of bottom surface 2, the inclination angle of keyboard 2 may be adjusted, which is the second state of leg 14. FIG. 4(a) is a perspective view of the device when the leg is in the second state. FIG. 4(b) is a cross-sectional view of the device along line II–II' of FIG. 4(a). Boss 20 engages with third aperture 12 to keep its position fixed.

Figure 5A:
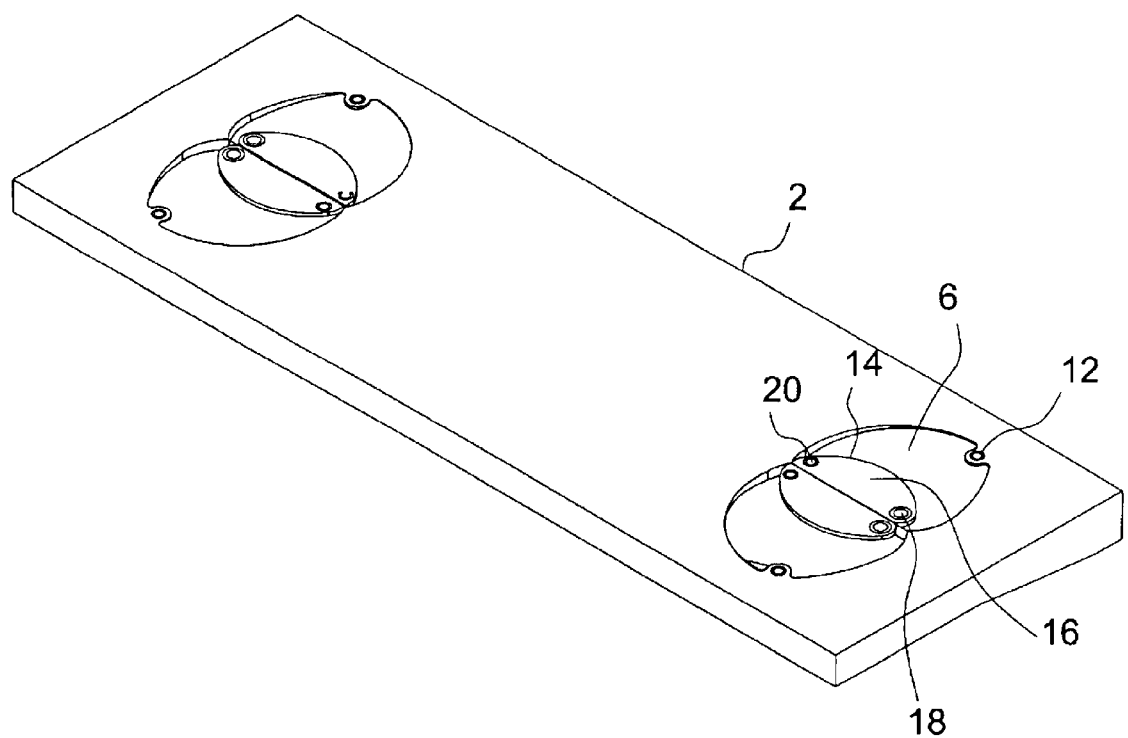
FIG. 5(a) is a perspective view of one embodiment of the present invention when both legs are in the first state.
Figure 5B:
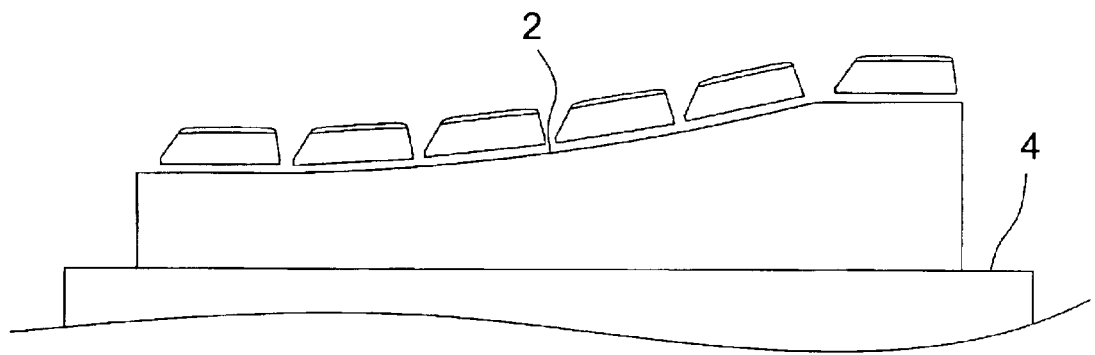
FIG. 5(b) is a side view of one embodiment of the present invention when both legs are in the first state.
Figure 6A:
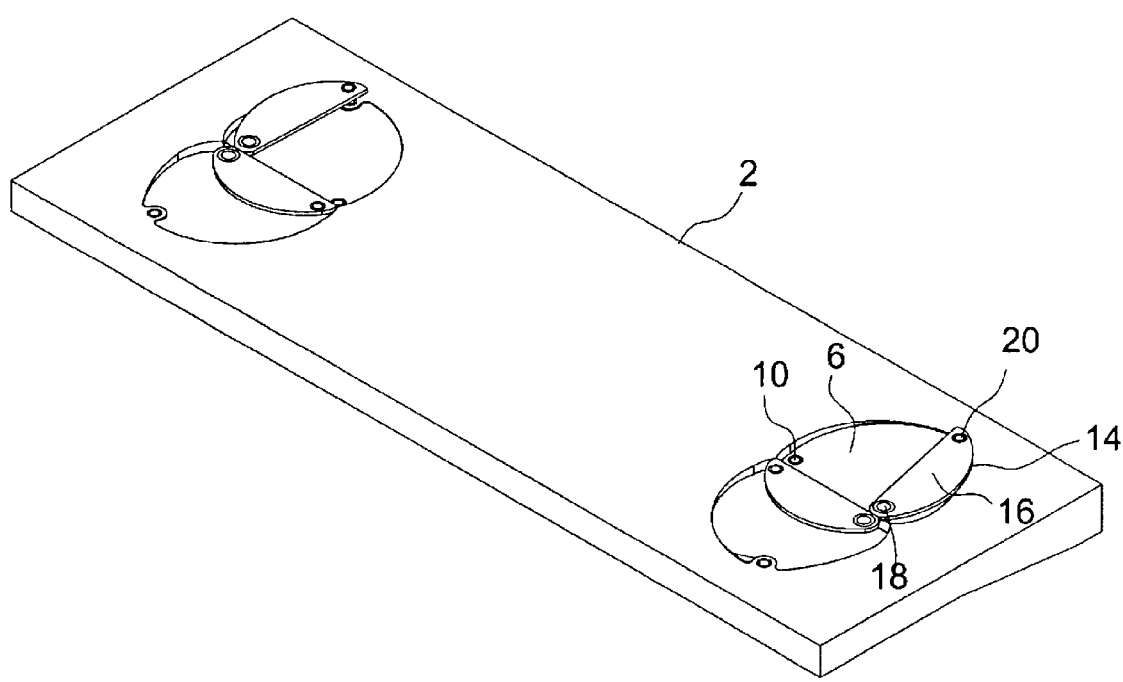
FIG. 6(a) is a perspective view of one embodiment of the present invention when the front leg is in the second state and the rear leg is in the first state.
Figure 6B:
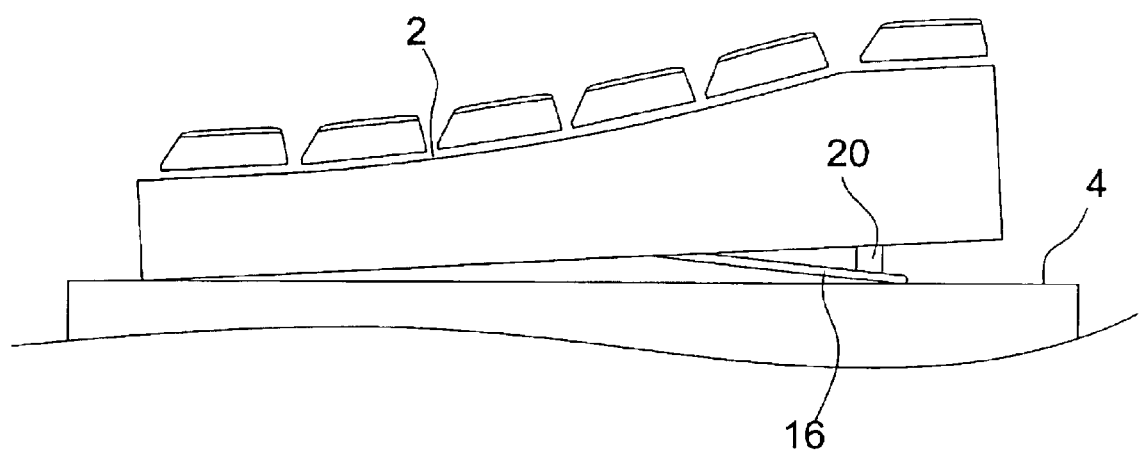
FIG. 6(b) is a side view of one embodiment of the present invention when the front leg is in the second state and the rear leg is in the first state.
Figure 7A:
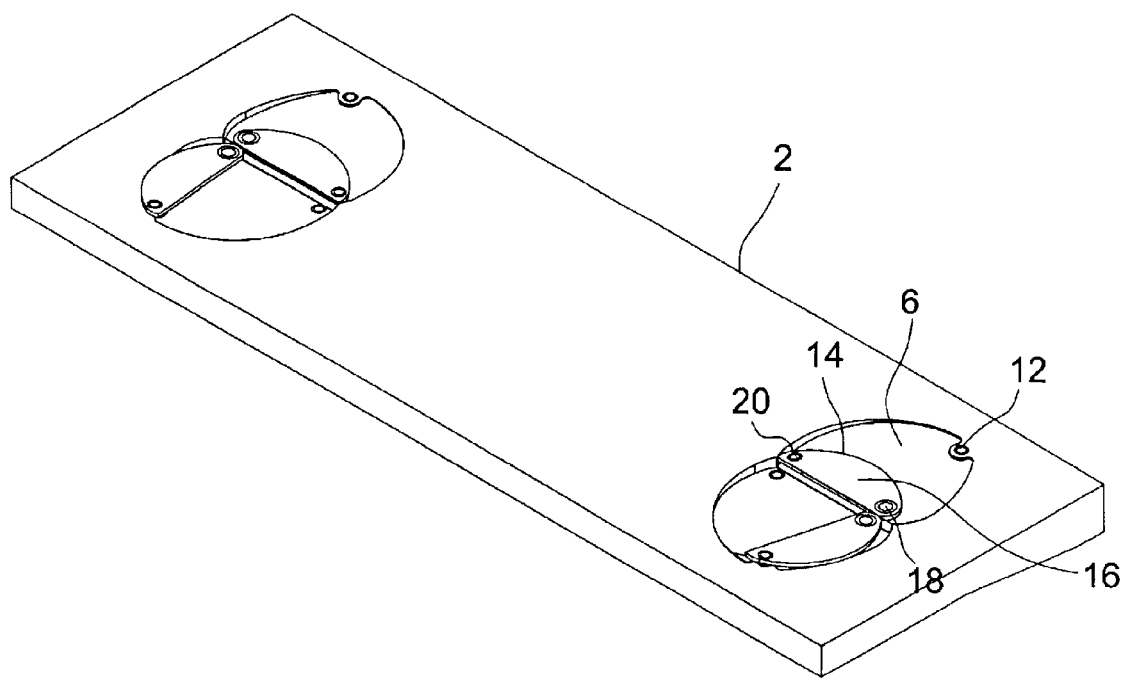
FIG. 7(a) is a perspective view of one embodiment of the present invention when the front leg is in the first state and the rear leg is in the second state.
Figure 7B:
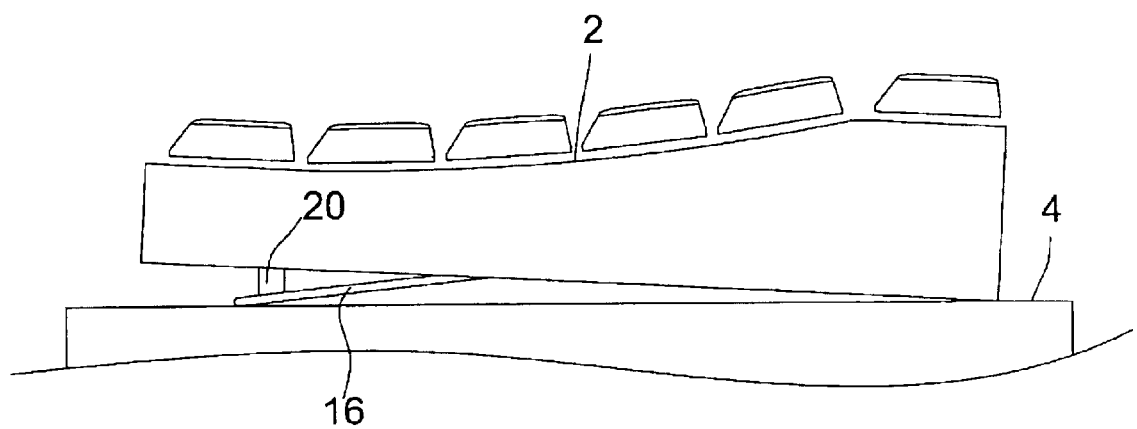
FIG. 7(b) is a side view of one embodiment of the present invention when the front leg is in the first state and the rear leg is in the second state.
Figure 8A:
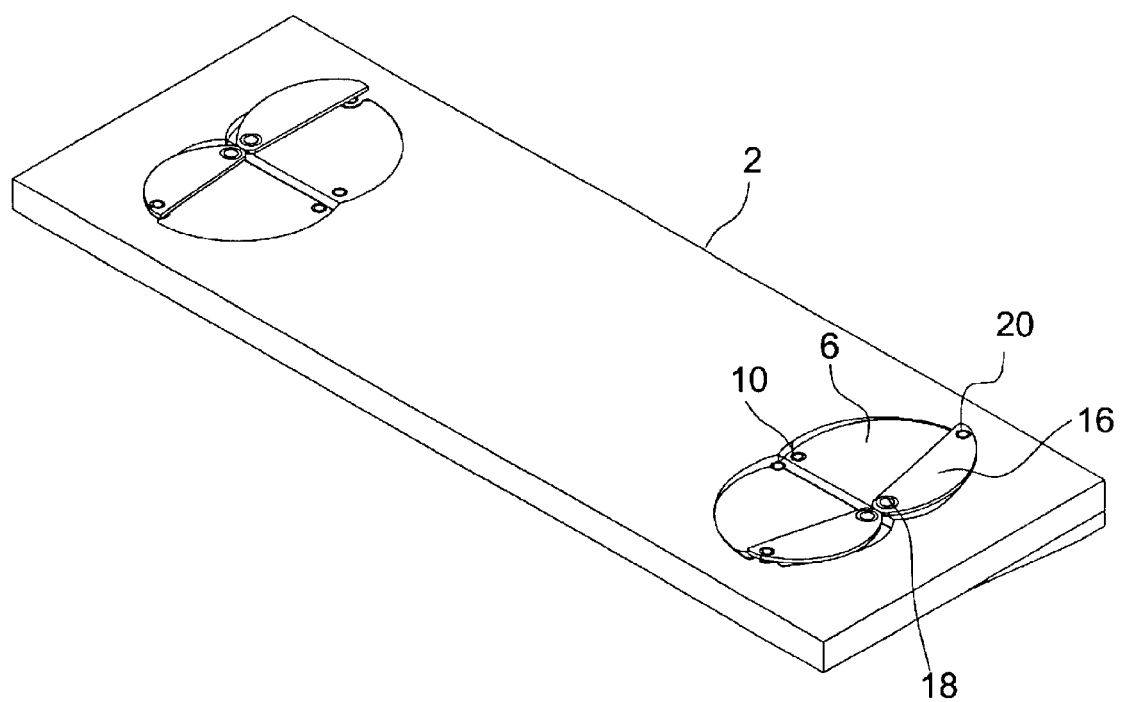
FIG. 8(a) is a perspective view of one embodiment of the present invention when both legs are in the second state.
Figure 8B:
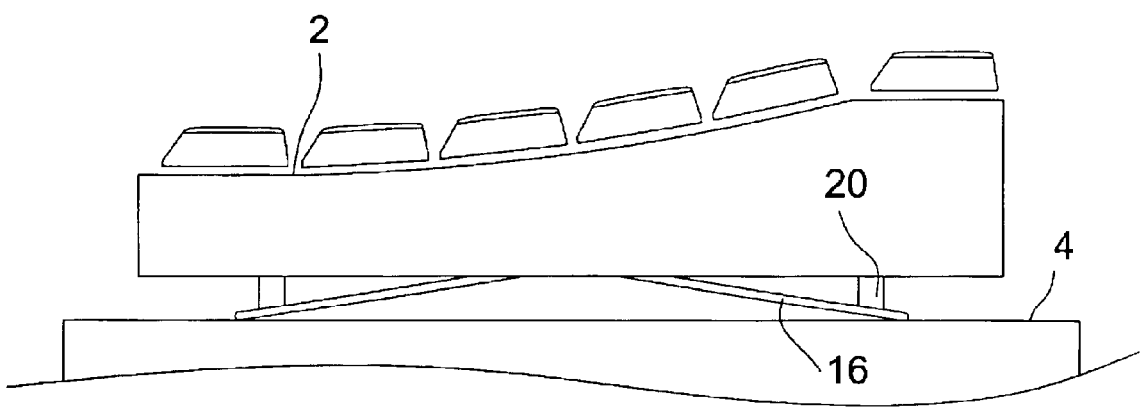
FIG. 8(b) is a side view of one embodiment of the present invention when both legs are in the second state.

In this embodiment, the present invention includes four support devices. As shown in FIGS. 5(a) and 5(b), the four legs 14 are all in the first state, i.e. legs 14 are all received in recesses 6. It means that the four legs 14 are not supporting keyboard 2 and the bottom surface of keyboard 2 is in complete contact with the desk surface. As shown in FIGS. 6(a) and 6(b), the two legs 14 of the front bottom surface of keyboard 2 are in the second state, and the two legs 14 of the rear bottom surface of keyboard 2 are in the first state. The front edge of keyboard 2 is propped up and the top surface of the keyboard slightly inclines towards users. Here the two front legs 14 extend out of bottom surface of keyboard 2 and the two rear legs 14 are still received in recess 6. As shown in FIGS. 7(a) and 7(b), the two legs 14 of the front bottom surface of keyboard 2 are in the first state, and the two legs 14 of the rear bottom surface of keyboard 2 are in the second state. The rear edge of keyboard 2 is propped up and the top surface of the keyboard slightly inclines away from users. Here the two front legs 14 are received in recesses 6 and the two rear legs 14 extend out of bottom surface of keyboard 2. As shown in FIGS. 8(a) and 8(b), the four legs 14 are all in the second state. Here the keyboard is elevated to a certain height, and its bottom surface is parallel to the desk surface.

As illustrated above, the support device of the present invention has two variations in angle, one of which is that the top surface of the keyboard slightly inclines towards users, and the other is that the top surface of the keyboard is slightly inclines away from users. And there are two variations in height, one of which is that the bottom surface of the keyboard is in complete contact with the desk surface, and the other is that the keyboard is parallel to a desk surface and the keyboard is simultaneously elevated for a certain height. Compared to conventional techniques, the keyboard may have more variations in angle or height to meet each user's personal needs.

It is especially noticed that the number of the support devices of the present invention is not restricted.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore as much as broadly apply.

I claim:

1. A keyboard comprising:
   a body;
   a first aperture formed on a bottom surface of said keyboard in such a way that a first specific angle, existing between an axis of said aperture and said bottom surface of said keyboard, is greater than 0° and smaller than 90°; and
   a leg including a supporter that has a first end and a second end, a boss disposed on said second end of said supporter, and a rod, the rod being protuberantly located on a first end of said supporter, and rotatably received and connected within said aperture,
   wherein said bottom surface of said keyboard comprises a recess for receiving said leg; and when said leg axially rotates around said rod, said leg allows itself to adjust a tilt angle between said keyboard and a surface of a desk via continuously rotating from a first state to a second state, and said second end contacts the bottom surface of said keyboard when said leg is both in said first state and in said second state.

2. The keyboard as claimed in claim 1, wherein a second specific angle existing between said axis of said rod and said body is greater than 0° and smaller than 90°.

3. The keyboard as claimed in claim 1, wherein when said leg is respectively in said first state and said second state, said boss affixes the position of said leg.

4. The keyboard as claimed in claim 3, said keyboard comprising a second aperture and a third aperture, said second aperture and third apertures being located on said bottom surface of said keyboard, when said leg is in said first state, said boss is engaged with said second aperture, and when said leg is in said second state, said boss is engaged with said third aperture.

5. The keyboard as claimed in claim 1, wherein said first aperture is located in said recess.

6. The keyboard as claimed in claim 5, wherein a depth of said recess decreases along a direction from the first state to the second state.

7. The keyboard as claimed in claim 6, said leg comprising a boss, said boss being disposed on a second end of said supporter and touching the surface of said recess.

8. The keyboard as claimed in claim 7, said keyboard comprising a second aperture and a third aperture, said second aperture and third apertures being located on said bottom surface of said keyboard, when said leg is in said first state, said boss is engaged with said second aperture, and when said leg is in said second state, said boss is engaged with said third aperture.

9. A keyboard comprising:

a body;

a first aperture, a second aperture, and a third aperture all formed on a bottom surface of said keyboard in such way that a first specific angle, existing between an axis of said first aperture and said bottom surface of said keyboard, is greater than 0° and smaller than 90°; and a leg including a supporter that has a first end and a second end, a rod and a boss being disposed on said second end of said supporter, wherein said rod is protuberantly located on a first end of said body, and rotatably received and connected within said first aperture, a second specific angle, existing between an axis of said rod and said body, is greater than 0° and smaller than 90°, and said bottom surface of said keyboard comprises a recess for receiving said legs, when said leg rotates around said rod as axis, said leg allows itself to adjust a tilt angle between said keyboard and a surface of a desk via continuously rotating from a first state to a second state, and said second end contacts the bottom surface of said keyboard when said leg is both in said first state and in said second state.

10. The keyboard as claimed in claim 9, wherein when the leg is respectively in said first state or said second state, said boss is respectively engaged with said second aperture or said third aperture to affix the position of said leg.

11. The keyboard as claimed in claim 9, wherein said first aperture is located in said recess.

12. The keyboard as claimed in claim 11, wherein a depth of the recess decreases along a direction from the first state to the second state.

13. A supporting device for use in a keyboard of computer, said keyboard comprising a front edge and a rear edge, said supporting device comprising:

a first leg disposed on a bottom surface of front edge of said keyboard, the first leg being selectively in a first state of being close to said bottom surface and in a second state of being away from said bottom surface, and said bottom surface comprising a recess for receiving said first leg; and a second leg disposed on a bottom surface of rear edge of said keyboard, the second leg being selectively in said first state of being close to said bottom surface and in said second state of being away from said bottom surface, and said bottom surface comprising a recess for receiving said second leg, wherein, said first leg and said second leg comprise a supporter that has a first end and a second end which contacts said bottom surface of said keyboard when said first leg and said second leg are both in said first state and in said second state, and selectively rendered in said first state and said second state allowing a tilt angle variation or a height variation of the keyboard with respect to a desk surface.

14. The supporting device as claimed in claim 13, characterized in that when both of said first leg and said second leg are simultaneously in the first state, said bottom surface of keyboard closely contacts with said desk surface.

15. The supporting device as claimed in claim 13, characterized in that when said first leg is in said first state and said second leg is in said second state, a top surface of said keyboard being slightly away from users.

16. The supporting device as claimed in claim 13, characterized in that when said first leg is in said second state and said second leg is in said first state, a top surface of said keyboard being slightly inclined toward users.

17. The supporting device as claimed in claim 13, characterized in that when both said first leg and said second leg are simultaneously in the second state, said keyboard is parallel to said desk surface and the keyboard is elevated by an amount.

* * * * *